Dec. 16, 1930.  H. GORANSON ET AL  1,785,012
FRUIT PITTER
Filed June 25, 1928  3 Sheets-Sheet 1

Inventors
Hjalmar Goranson
David Goranson
By Lyon & Lyon
Attorneys

Dec. 16, 1930.  H. GORANSON ET AL  1,785,012
FRUIT PITTER
Filed June 25, 1928   3 Sheets-Sheet 2

Inventors
Hjalmar Goranson
David Goranson
By Lyon & Lyon
Attorneys

Dec. 16, 1930.  H. GORANSON ET AL  1,785,012
FRUIT PITTER
Filed June 25, 1928  3 Sheets-Sheet 3

Inventors
Hjalmar Goranson
David Goranson
By Lyon & Lyon
Attorneys

Patented Dec. 16, 1930

1,785,012

UNITED STATES PATENT OFFICE

HJALMAR GORANSON AND DAVID GORANSON, OF SAN JOSE, CALIFORNIA, ASSIGNORS, BY MESNE ASSIGNMENTS, TO PACIFIC MACHINERY COMPANY, OF SAN FRANCISCO, CALIFORNIA, A CORPORATION OF CALIFORNIA

FRUIT PITTER

Application filed June 25, 1928. Serial No. 287,992.

This invention relates to fruit pitters, and is more particularly related to an apparatus for use in pitting cling-stone peaches.

In the canning or drying fruit, it is desirable to remove the pit of the fruit from the fruit while removing a minimum of the flesh of the fruit and in the canning of fruit, and particularly cling-stone peaches, it is essential that the pit of the fruit be removed with sufficient of the flesh of the fruit to remove all of the "red center" which surrounds the pit of the fruit, and also sufficient of the fruit to insure that all of the projecting fins or portions of the pit of the fruit are cut away from the remaining flesh.

An object of this invention is to provide a means for pitting fruit which includes means upon which the fruit is impaled and a pitting means which is adapted to be actuated into the flesh of the fruit to surround the pit thereof as impaled on the first said means and for actuating the pitting means in such a manner as to cut the pit of the fruit from the flesh thereof.

Another object of this invention is to provide a pitting machine, including an impaling blade having a pit receiving slot upon which the fruit to be pitted is to be impaled with the pit thereof in the slot, and a pitting knife and means for effecting relative movement between the pitting knife and the impaling blade so that the pitting knife is caused to pass around the pit of the fruit as impaled on said blade.

Another object of this invention is to provide a pitter for removing the pit from a fruit and for halving the fruit in one operation.

Other objects and advantages of this invention it is believed will be apparent from the following detailed description of a preferred embodiment thereof as illustrated in the accompanying drawings:

Figure 1:
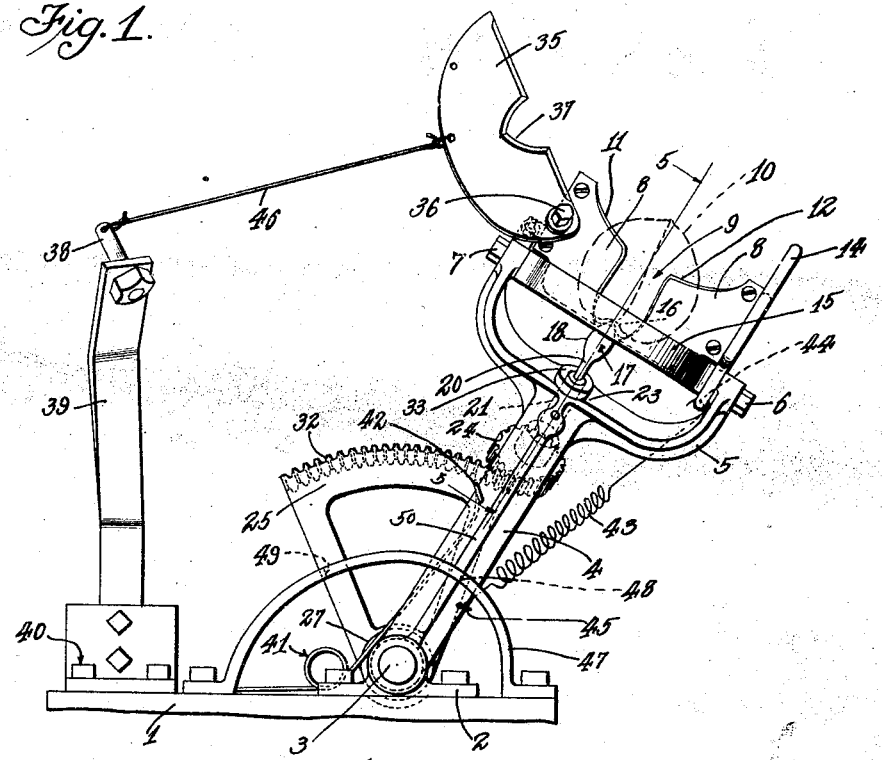
Figure 1 is a front elevation of a pitting machine embodying this invention illustrating the relative parts of the machine in the starting position with a peach in dotted lines as shown impaled on the impaling blades of the machine.
Figure 2:
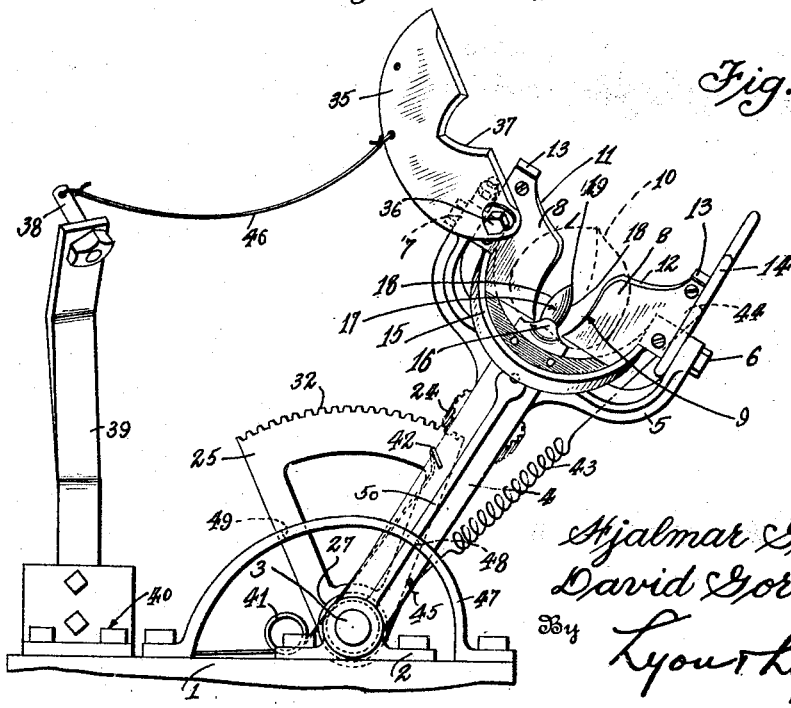
Figure 2 is a front elevation similar to Figure 1 illustrating the impaling blade as rotated to thrust the pitting member around the pit of the fruit.

In the preferred embodiment of this invention illustrated in the accompanying drawing, 1 indicates a support which may be a table, bench or any other desired support upon which the peach pitter embodying this invention is adapted to be mounted. Secured to the support 1 are brackets 2 within which a shaft 3 is mounted. Journaled on the shaft 3 is an arm 4. The arm 4 is formed as a yoke 5 at its upper end and within the yoke 5 is supported on trunnions 6 and 7 an impaling blade 8.

The impaling blade 8 is provided with a pit receiving recess 9 into which the pit of the fruit indicated in dotted lines at 10 is adapted to be received. The impaling blade 8 is provided with sharpened edges 11 and 12 which act to cut the flesh of the fruit 10 as the fruit is impaled on the blade 8 until the pit is within the recess 9. The impaling blade 8 is journaled on the trunnion 6 to permit the impaling blade 8 to rotate relative to the yoke 5. The impaling blade is carried by a carrier 13 which is provided with an actuating handle 14, and which is also provided with an arcuate guard 15 which extends forwardly from the impaling blade 8. Secured to the guard 15 is a guard blade 16 which protects the hand of the operator from the pitting knife 17. The guard 16 also serves as a stop for the fruit when the same is impaled on the impaling blade 8.

The pitting knife 17 at the starting position of the pitting operation extends only to the lowermost end of the pit receiving recess 9 of the impaling blade 8. The pitting knife 17 is illustrated as formed in the form of a spoon having sharpened edges 18 and a sharp point 19. The shank 20 of the pitting knife 17 is secured to a shaft 21 by means of a set screw 22. The shaft 21 extends through the yoke 5 at its upper end through a bearing extension 23 of the arm 4 at its lower end. Secured to the lower end of the shaft 21 is a spur pinion gear 24 which meshes with an arcuate rack 25. The rack 25 is secured in position and supported from the shaft 3 by means of a pin 26 which passes through the hub portion 27 of the gear rack 25 and through the shaft 3.

In order to hold the shaft 21 in position, a bearing 28 is journaled on the shaft 21 above the spur pinion gear 24, and this bearing 28 is held in position by means of set screws 29 and 30 which are screw-threaded through ears 31 formed on the extension of the yoke 5. The bearing 28 thus has a swinging support on the screws 29 and 30. The spur pinion gear 24 meshes with the teeth 32 formed on the rack segment 25. An eccentric collar 34 is secured to the shaft 21 on one side of the transverse extension of the yoke 5. The collar 33 is mounted on the shaft 21. The shaft 21 passes through a slot 121 formed in the transverse extension of the yoke 5. As the knife is rotated around the pit, its eccentric mounting and loose support formed by the screws 29 and 30 cause the knife to travel in an oval path close to the contour of the pit of the fruit. The eccentric collar 34 forms a cam which engages the face 134 to cause the knife 17 to pass through the oval path and the loose bearing mounted permits the shaft 21 to travel in this manner.

In order to complete the halving of the fruit after the pit has been severed from the flesh of the fruit, a blade 25 is pivotally supported on a pin 36. The pin 36 is screw-threaded to the carrier 13 which supports the impaling blade 8. The blade 35 is provided with a recess 37 to permit the blade 35 to come down over the pit of the fruit 10 within the recess 9 so as to completely sever the flesh of the fruit around the pit and permit the halves of the fruit to fall away.

In order to actuate the blade 35, there is provided a cam pin 38 which is secured to a standard 39. The standard 39 is secured to the support 1 as indicated at 40. In order to cause the fruit pitting machine to return to the position illustrated in Figure 1 from the position illustrated in Figure 3, a spring 41 is secured at one end to the support 1 and at its opposite end engages the arm 4, as illustrated at 42, to cause the arm 4 to return to the position illustrated in Figure 1 from the position illustrated in Figure 3.

In order to return the impaling blade 8 to the position for receiving the fruit, a spring 43 is provided which is secured to the carriage 13 at one end as indicated at 44, and is secured to the arm 4 at its opposite end as illustrated at 45.

Figure 3:
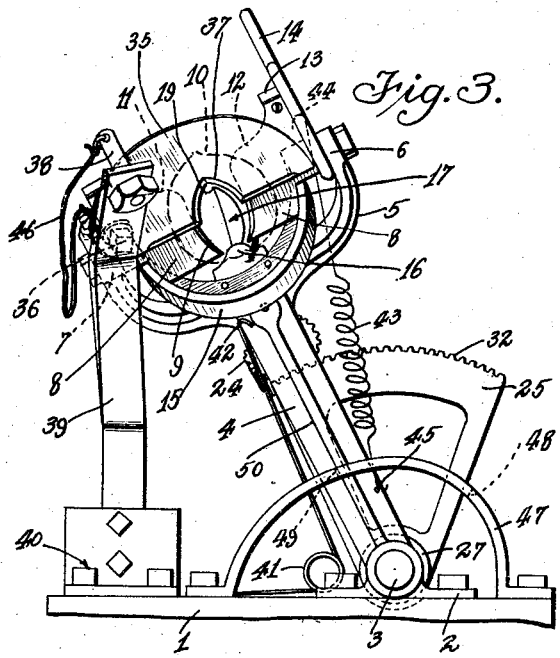
Figure 3 is a similar front elevation illustrating the pitting means as actuated to the position to complete the severing of the pit from the fruit and the completing of the cutting of the fruit in halves.
Figure 4:
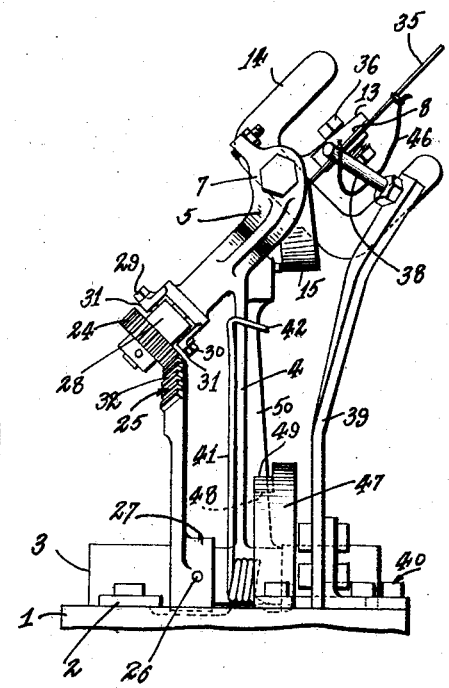
Figure 4 is an end elevation of the fruit pitter embodying this invention illustrating the same with the impaling blade as moved to thrust the pitting knife around the pit of the fruit and illustrating the device as actuated to move the same through a portion of its travel.
Figure 5:
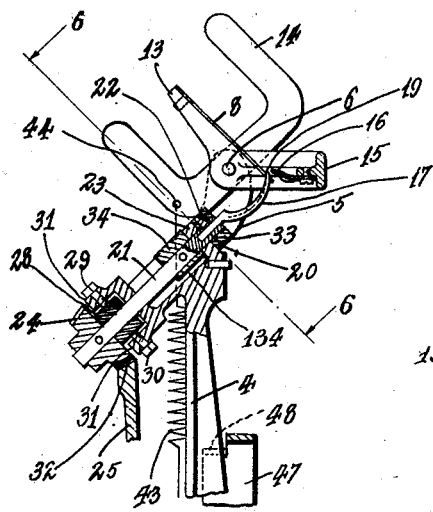
Figure 5 is a sectional view taken substantially on the line 5—5 of Figure 1.
Figure 6:
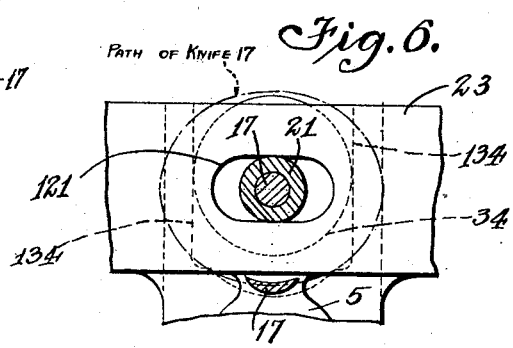
Figure 6 is an enlarged sectional view taken substantially on the line 6—6 of Figure 5, illustrating the eccentric mounting of the pitting knife to cause the same to travel in an oval path and illustrating in dotted lines the path of the knife in passing around the pit of a fruit.

In order to return the blade 35 to a non-operative position after the same has been rotated to complete the halving of the flesh of the fruit, a cord or any other suitable or desirable form of flexible connecting member 46 is secured at one end of the blade 35 and at its opposite end to the cam pin 38, the cord being of just sufficient length to cause the blade 35 to assume a position as illustrated in Figure 1 when the arm 4 has been returned to the starting position, but being of insufficient length to permit the blade 35 to remain in the closed, or cutting, position shown in Figure 3.

In order to maintain the pitting machine operable within definite limits, a stop bar 47 is provided which is provided with stop shoulders 48 and 49 which are adapted to engage the web 50 of the arm 4 to stop the arm 4 in position to prevent the spur pinion gear 24 passing off the gear rack at the ends of the gear rack 25.

The operation of the fruit pitter embodying our invention is as follows:

The fruit 10 is impaled upon the impaling blade 8 until the pit of the fruit is within the pit receiving recess 9. The operator grips the handle 14 and rotates the impaling blade 8 to thrust the pitting knife 17 around the pit of the fruit within the recess 9. The operator then moves the arm 4 to cause the spur pinion gear 24 to travel along the teeth 32 of the rack 25. The moving of the pinion 24 along the teeth 32 of the rack 25 causes the shaft 21 to be rotated, and hence to rotate the pitting knife 17 completely around the pit of the fruit which has been impaled upon the impaling blade. As the arm 4 is moved in its arcuate path, the edge of the blade 35 engages the pin 38 and on continued movement of the arm 4 the blade 35 is caused to rotate around the pin 36 until the blade 35 has been moved to a position to completely sever the flesh of the fruit impaled upon the impaling blade 8 so that the halves of the fruit as separated from each other and from the pit of the fruit fall out of the pitting machine. The operator then merely releases the handle 14 and the springs 41 and 43 return the arm 4 and impaling blade 8 to the starting position.

Any other suitable form of means might be provided for actuating the blade 35 in place of the cam pin 38 which acts upon the curved surface 50 of the blade 35 such, for example, as by gearing the blade 35 directly to the shaft 21 so that after a predetermined rotation of the shaft 21, the blade 35 will be brought to position to complete the severing of the flesh of the fruit around the pit thereof.

Figure 7:
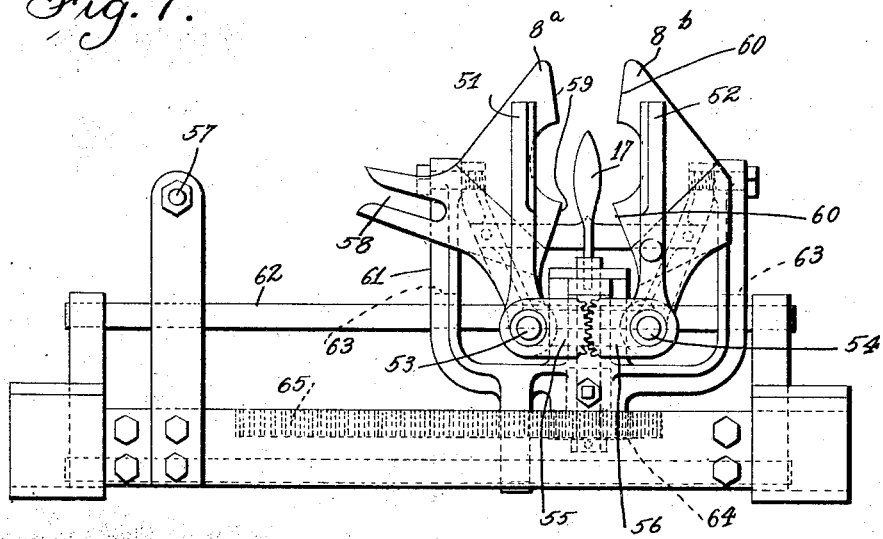
Figure 7 is a front elevation of a modified form of fruit pitter embodying this invention.
Figure 8:
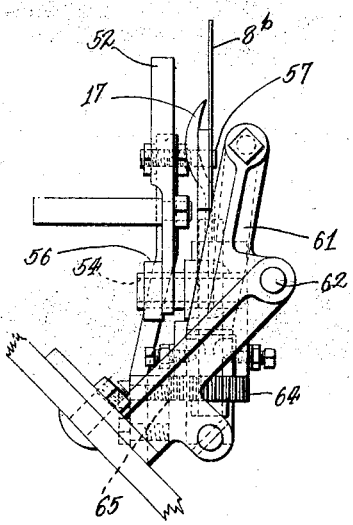
Figure 8 is an end elevation of a modified form of a pitter illustrated in Figure 7.

In the modified form of this invention illustrated in Figures 7 and 8, substantially the same form of construction is illustrated with the exception that the device as illustrated in these figures is provided with holders 51 and 52 for holding the fruit on the impaling blade 8. The holders 51 and 52 are provided for holding the fruit on the impaling blade so as to release one hand of the operator to enable the operator to pick up another fruit while pitting the fruit on the machine. The holders 51 and 52 may be and preferably are provided with gear segment connecting means in the same manner as the impaling blades 8ª and 8ᵇ are connected by the gear segments 55 and 56.

In this modified form of peach pitter the impaling blade 8 is formed in two half sections, 8ª and 8ᵇ, which are journaled on pins 53 and 54 and are connected with the gear segments 55 and 56. In order to complete the severing of the flesh of the fruit around the pit in this modified form of pitting machine, a pin 57 is provided which engages within a slide-way 58 and moves the impaling blade 8ª toward the pit of the fruit, causing the sharpened edges 59 of the blade 8ª to cut the flesh of the fruit to the center of the fruit, and as the gear segments 55 and 56 are in mesh in movements of the impaling blade 8ª, causes the impaling blade 8ᵇ to move in a like manner toward the center of the fruit so that the sharpened edges 60 of this impaling blade 8ᵇ sever the the flesh of the fruit to the center of the fruit.

In this modified form of fruit pitting machine, the yoke 61 which is similar to the yoke 5, is journaled on a shaft 62 in bearings 63 to permit the yoke 61 to be moved longitudinally of the machine so that the pinion 64 will travel along the straight gear rack 65 and cause the pitting knife 17 to rotate around the pit of the fruit in the same manner as the pitting knife 17 is caused to rotate around the pit in the other form of pitting machine described.

Having fully described our invention, it is to be understood that we do not wish to be limited to the details herein set forth, but our invention is of the full scope of the appended claims.

We claim:

1. In a fruit pitter, the combination of an impaling blade having a pit receiving recess therein, a pitting member, means for actuating the impaling blade to thrust the pitting member around the pit of the fruit, and means for rotating the pitting member to cut the pit from the flesh of the fruit.

2. In a fruit pitter, the combination of an impaling blade having a pit receiving recess therein, a pointed rotary pitting knife, means for effecting a relative movement between the rotary pitting knife and the impaling blade to thrust the pitting knife point first into the flesh of the fruit and around the pit of the fruit, and means for rotating the pitting knife around the pit.

3. In a device of the class described, the combination of an impaling blade having a pit receiving recess therein, the impaling blade having sharpened edges for severing the flesh of the fruit around the pit, a pitting knife, means for causing a relative movement of the impaling blade and the pitting knife to cause the pitting knife to pass around the pit of the fruit as impaled on the impaling blade, and means for rotating the pitting knife.

4. In a fruit pitter, the combination of an impaling blade having a pit receiving recess, therein, a pointed pitting knife, means for causing relative movement between the pitting knife and the impaling blade to cause the pitting knife to pass point first through the flesh of the fruit into position around the pit of the fruit, means for actuating the pitting knife to sever the pit from the flesh of the fruit, and a second blade adapted to be actuated to complete the halving of the flesh of the fruit.

5. A fruit pitter comprising means for halving the flesh of the fruit, a pointed rotary pitting knife, means for thrusting the rotary pitting knife point first into the flesh of the fruit and around the pit, and means for rotating the pitting knife to cut the pit from the flesh of the fruit.

6. A fruit pitter comprising an impaling blade having a pit receiving recess therein, pitting means, means for thrusting the pitting means into the flesh of the fruit as impaled on the impaling blade, and means for actuating the pitting means to cut the pit from the flesh of the fruit.

7. In a fruit pitter, the combination of an impaling blade having a pit receiving recess therein, a pitting member, means for moving the pitting member into said pit receiving recess after the fruit has been impaled on the impaling blade, and means for actuating the pitting member to cut the pit from the flesh of the fruit.

8. In a fruit pitter, the combination of an impaling blade having a pit receiving recess therein, pitting means, means for actuating the pitting means to cause the same to move into the pit receiving recess after the fruit has been impaled on the impaling blade, means for actuating the pitting means to cut the pit from the flesh of the fruit, and means for completing the halving of the flesh of the fruit.

9. In a fruit pitter, the combination of an impaling blade having a pit receiving recess therein, upon which the fruit is adapted to be impaled to sever a portion of the flesh of the fruit, pitting means, means for effecting a relative movement between the pitting means and impaling blade to move the pitting means into said pit receiving recess, means for actuating the pitting means to cut the pit from the flesh of the fruit, and means adapted to be actuated to complete the halving of the flesh of the fruit.

10. In a fruit pitter, the combination of an impaling blade upon which fruit is adapted to be impaled, a rotary pitting knife, means for actuating the impaling blade to thrust the rotary pitting knife around the pit of the fruit, and means for rotating the pitting knife to cut the pit from the flesh of the fruit.

11. In a fruit pitter, the combination of means upon which a fruit is adapted to be impaled, said means providing a pit receiving recess, a rotary pitting knife, means for effecting relative movement between the rotary pitting knife and the impaling means to cause the pitting knife to pass around the pit of the fruit, means for actuating the rotary pitting knife to sever the pit from the flesh of the fruit, and means for actuating the impaling means to completely halve the flesh of the fruit.

12. In a fruit pitter, the combination of an impaling blade having a pit receiving recess, means for pivotally supporting the impaling blade, a rotary pitting knife, means for rotating the impaling blade on its pivots to cause the pitting knife to be thrust around the pit of the fruit in said pit receiving recess, and means for rotating the pitting knife to sever the pit from the flesh of the fruit.

13. In a device of the class described, the combination of an impaling blade having a pit receiving recess upon which impaling blade fruit is adapted to be impaled with its pit in said recess, pitting means, means for rotating the impaling blade to thrust the pitting means into operative position relative to the pit of the fruit in said recess, and means for actuating the pitting means to sever the pit from the flesh of the fruit.

14. In a fruit pitter, the combination of an impaling blade having a pit receiving recess and upon which impaling blade fruit is adapted to be impaled with its pit in said pit receiving recess, pointed pitting means, means for effecting relative movement between the impaling blade and pitting means to move the pitting means point first into operative position relative to the pit of the fruit and means for actuating the pitting means to remove the pit from the fruit.

15. In a device of the class described, the combination of an impaling blade upon which fruit to be pitted is adapted to be impaled, means for pivotally supporting the impaling blade, pitting means, the said pitting means being adapted to enter the flesh of the fruit on pivotal movement of said impaling blade toward said pitting means, and means for actuating the pitting means to sever the flesh of the fruit from the pit 16. In a device of the class described, the combination of an impaling blade upon which fruit to be pitted is adapted to be impaled to sever a portion of the flesh in the plane of suture from the fruit substantially to the pit of the fruit, means for pivotally supporting the impaling blade, pitting means, the said pitting means being adapted to enter the flesh of the fruit on pivotal movement of said impaling blade toward said pitting means, means for actuating the pitting means to sever the flesh of the fruit from the pit, and means for completing the severing of the flesh of the fruit in the plane of suture of the pit of the fruit.

17. In a fruit pitting machine, the combination of an impaling blade upon which fruit to be pitted is adapted to be impaled, a rotary pitting member, means for supporting the impaling blade with the pitting means extending into a pitting recess formed in the impaling blade, and means operatively connected with the pitting means for rotating the pitting means as the impaling blade is moved.

18. In a fruit pitting machine, the combination of a standard, an impaling blade supported by the standard, pitting means supported by the standard, means for rotating the pitting means in a non-circular path within a pitting recess formed in the impaling blade as the said standard is moved.

19. In a fruit pitting machine, the combination of a standard, impaling means upon which fruit to be pitted is adapted to be impaled supported on the standard, pitting means supported by the standard and extending into the pitting recess, means for supporting the said standard to permit the same to be moved through a predetermined path, and means operatively connecting the pitting means and the latter said supporting means for rotating the pitting means to sever the pit from the flesh of the fruit impaled on the impaling blade upon movement of the said standard through the said predetermined path.

Signed at San Francisco, Calif., this 13th day of June, 1928.

HJALMAR GORANSON.
DAVID GORANSON.